United States Patent
Aoyama (10) Patent No.: US 11,067,194 B2
(45) Date of Patent: Jul. 20, 2021

(54) COMBINATION VALVE

(71) Applicant: CKD CORPORATION, Komaki (JP)

(72) Inventor: Tatsuhito Aoyama, Kasugai (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 16/700,146

(22) Filed: Dec. 2, 2019

(65) Prior Publication Data

US 2020/0224787 A1 Jul. 16, 2020

(30) Foreign Application Priority Data

Jan. 11, 2019 (JP) .............................. JP2019-003235

(51) Int. Cl.
*F16K 31/143* (2006.01)

(52) U.S. Cl.
CPC .................................. *F16K 31/143* (2013.01)

(58) Field of Classification Search
CPC ....... F16K 31/14; F16K 31/143; F16K 31/145
USPC .......................................................... 251/14
See application file for complete search history.

(56) References Cited

U.S. PATENT DOCUMENTS

| | | | | |
|---|---|---|---|---|
| 620,287 A * | 2/1899 | Donnelly | .............. | F16K 31/143 251/14 |
| 1,477,346 A * | 12/1923 | Halliwell | .............. | F16K 31/143 415/32 |
| 1,970,963 A * | 8/1934 | Hose | ..................... | F16K 31/143 251/14 |
| 2,890,014 A * | 6/1959 | Luoma | .................. | F16K 31/143 251/14 |
| 3,378,224 A * | 4/1968 | Boyle | ................... | F16K 31/143 251/14 |
| 3,980,270 A * | 9/1976 | Thomas | ................. | A62C 35/02 251/30.01 |
| 4,008,735 A * | 2/1977 | Thompson | ............. | F16K 31/14 137/495 |
| 4,359,203 A * | 11/1982 | Cho | ........................ | F16K 3/186 251/167 |
| 8,656,953 B2 | 2/2014 | Mohammed et al. | | |
| 2003/0201015 A1* | 10/2003 | Fukano | ..................... | F16K 7/14 137/556 |
| 2005/0121634 A1 | 6/2005 | Iwabuchi et al. | | |
| 2006/0175563 A1 | 8/2006 | Tsubota et al. | | |

(Continued)

FOREIGN PATENT DOCUMENTS

| | | |
|---|---|---|
| JP | 3752586 B2 | 3/2006 |
| JP | 4108596 B2 | 6/2008 |
| JP | 4261282 B2 | 4/2009 |

*Primary Examiner* — Kenneth Rinehart
*Assistant Examiner* — Jonathan J. Waddy
(74) *Attorney, Agent, or Firm* — Oliff PLC (57) ABSTRACT

A combination valve includes a valve seat, a diaphragm valve element, a pilot system to automatically bring the diaphragm valve element into or out of contact with the valve seat by use of air pressure, and a manual system to hold the diaphragm valve element in contact with the valve seat even while air pressure is supplied. In the combination valve, a piston rod is provided such that, when the handle is turned to move the manual stem in a seating direction while the diaphragm valve element and the valve seat are separated from each other, the piston rod moves in the seating direction relative to a first piston and a second piston that are pushed by the air pressure in a separating direction.

6 Claims, 8 Drawing Sheets

(56) References Cited

U.S. PATENT DOCUMENTS

| | | | |
|---|---|---|---|
| 2012/0085445 A1* | 4/2012 | Risse | F16K 1/443 |
| | | | 137/637 |
| 2016/0230906 A1* | 8/2016 | Tanikawa | F16K 15/186 |
| 2018/0087678 A1* | 3/2018 | Tokuda | F16K 31/1221 |

* cited by examiner

COMBINATION VALVE

CROSS-REFERENCE TO RELATED APPLICATIONS

This application is based upon and claims the benefit of priority from the prior Japanese Patent Application No. 2019-003235 filed on Jan. 11, 2019, the entire contents of which are incorporated herein by reference.

BACKGROUND

Technical Field

The present disclosure relates to a combination valve integrally including a pilot valve system and a manual system.

Related Art

For example, in a gas facility such as semiconductor manufacturing equipment, a pilot valve is placed in a gas pipe to control gas flow. This pilot valve needs a safety device to prevent for example leakage of gas due to erroneous or careless operations during a work to replacement of the gas pipe. Meanwhile, devices arranged in the gas facility are demanded to be small in size in order to make the gas facility compact. In the gas facility, therefore, a combination valve integrally including a pilot valve system and a manual system serving as a safety device to prevent erroneous or careless operations of the pilot valve system has conventionally been used (e.g., see Japanese Patent No. 4261282, U.S. Pat. No. 8,656,953, Japanese Patent No. 3752586, and Japanese Patent No. 4108596)

For example, in the combination valve disclosed in Japanese Patent No. 4261282, in the case where a piston urged by an urging member toward a valve seat, i.e., in a seating direction, is pushed by the air pressure to separate from the valve seat, i.e., in a separating direction, thereby separating a valve element from the valve seat, when a handle is turned, a manual stem coupled to the handle is moved in the seating direction through a screw part and contacts a sub rod. This sub rod pushes down a piston rod integrally attached to the piston according to movement of the manual stem in the seating direction, thereby making the valve element contact with the valve seat. In this state, the movement of the piston rod in the separating direction is restricted by the manual stem. Thus, the combination valve holds the valve element and the valve seat in contact relation even while the air pressure is supplied to the combination valve.

For example, in each of the combination valves disclosed in U.S. Pat. No. 8,656,953, Japanese Patent No. 3752586, and Japanese Patent No. 4108596, while operation air is being supplied to a pressure chamber of a pilot system, separating a valve element from a valve seat, when a handle is operated, the operation air is discharged from the pressure chamber. When the inner pressure of the pressure chamber lowers, the piston pushed by the operation air is caused to move in the seating direction by the urging force of a spring, thereby bringing the valve element into contact with the valve seat through the piston rod. Turning the handle moves the manual stem coupled to the handle in the seating direction to restrict movement of the piston rod. Thus, the combination valve holds the valve element and the valve seat in contact relation even while the operation air is supplied to the combination valve.

SUMMARY

Technical Problems

However, the foregoing conventional arts have the following problems. Specifically, in the combination valve disclosed in Japanese Patent No. 4261282, when the handle is to be turned while the valve element is out of contact with the valve seat, the air pressure acting on the piston in the separating direction will act on a screw part through the piston rod. Thus, the handle of this combination valve has to be turned against the air pressure and hence requires a strong force to turn.

In each of the combination valves disclosed in U.S. Pat. No. 8,656,953, Japanese Patent No. 3752586, and Japanese Patent No. 4108596, when the handle is to be turned, the operation air is discharged from the pressure chamber to reduce the inner pressure of the pressure chamber. Thus, the handle only requires a smaller force to turn than that in the combination valve disclosed in Japanese Patent No. 4261282. However, such a configuration needs a flow passage and a component for discharging operation air from the pressure chamber according to the operation of the handle. This leads to a complicated structure of a combination valve.

The present disclosure has been made to address the above problems and has a purpose to provide a combination valve with a simple structure which needs only a small force to turn a handle while a valve element is out of contact with a valve seat.

Means of Solving the Problems

To achieve the above problems, one aspect of the present disclosure provides a combination valve comprising: a valve seat; a valve element; a pilot system configured to automatically bring the valve element into or out of contact with the valve seat by use of air pressure; and a manual system configured to hold the valve element in contact with the valve seat even while the air pressure is supplied to the pilot system, wherein the pilot system includes: a piston; a first urging member configured to urge the piston in a seating direction; and a piston rod slidably extending through the piston, the piston rod being configured to bring the valve element into contact with the valve seat when the piston rod receives an urging force of the first urging member through the piston, and the manual system includes: a manual stem placed coaxially with the piston rod; a handle coupled to the manual stem; and a screw part configured to move the manual stem in an axial direction according to with turning of the handle, and the piston rod is placed to be movable in the seating direction relative to the piston when the handle is turned to move the manual stem in the seating direction while the valve element is separated from the valve seat.

In the combination valve configured as above, in a case where the valve element is out of contact with the valve seat, when the handle is turned to move the piston rod in the seating direction (i.e., in a direction toward the valve seat), the piston rod is disconnected or separated from the piston on which the air pressure acts in the separating direction (i.e., in a direction away from the valve seat) opposite the seating direction. Accordingly, the air pressure acting on the piston does not act on the screw part through the piston rod. Thus, the foregoing combination valve only needs a smaller force to turn the handle than the conventional combination valve (e.g., see Japanese Patent No. 4261282) in which the piston rod is integrally provided to the piston and the air pressure acting on the piston acts on the screw part through the piston rod. The foregoing combination valve in the present disclosure needs no flow passage and no component used to reduce the air pressure acting on the piston and thus can have a simple structure. The combination valve configured as above enables the handle to be turned with a small force through a simple structure while the valve element is separated from the valve seat.

Consequently, the present disclosure can provide a combination valve enabling a handle to be turned with a small force through a simple structure while the valve element is out of contact with the valve seat.

DETAILED DESCRIPTION OF THE EXEMPLARY EMBODIMENTS

Figure 1:
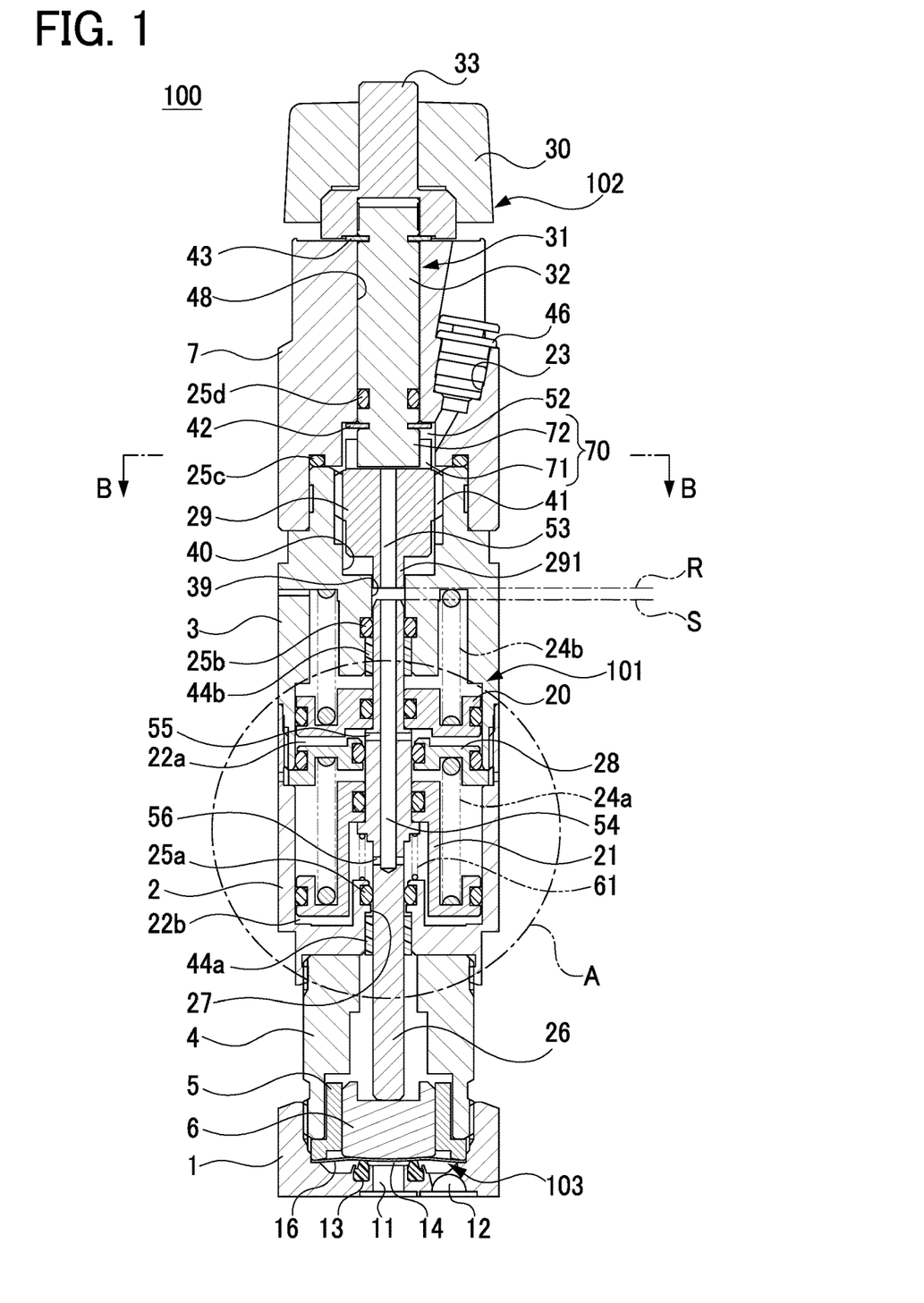
FIG. 1 is a vertical cross-sectional view of a combination valve in an embodiment according to the present disclosure, in which a manual system is in a safety-system releasing state, a pilot system is in an automatic closing state, and a valve system is in a valve closed state.
Figure 2:
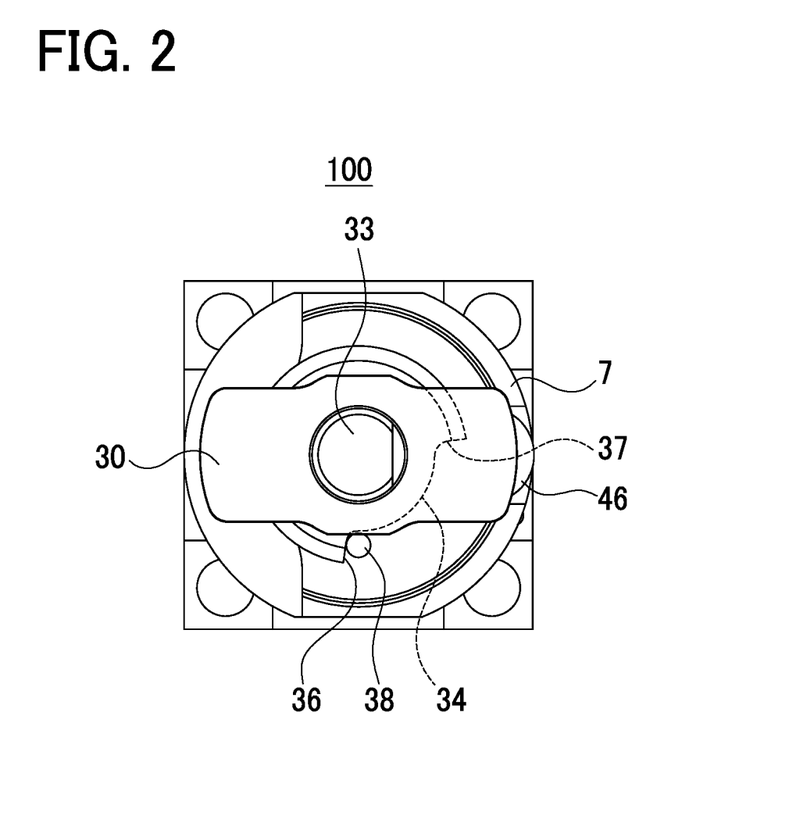
FIG. 2 is a plan view of the combination valve shown in FIG. 1.
Figure 3:
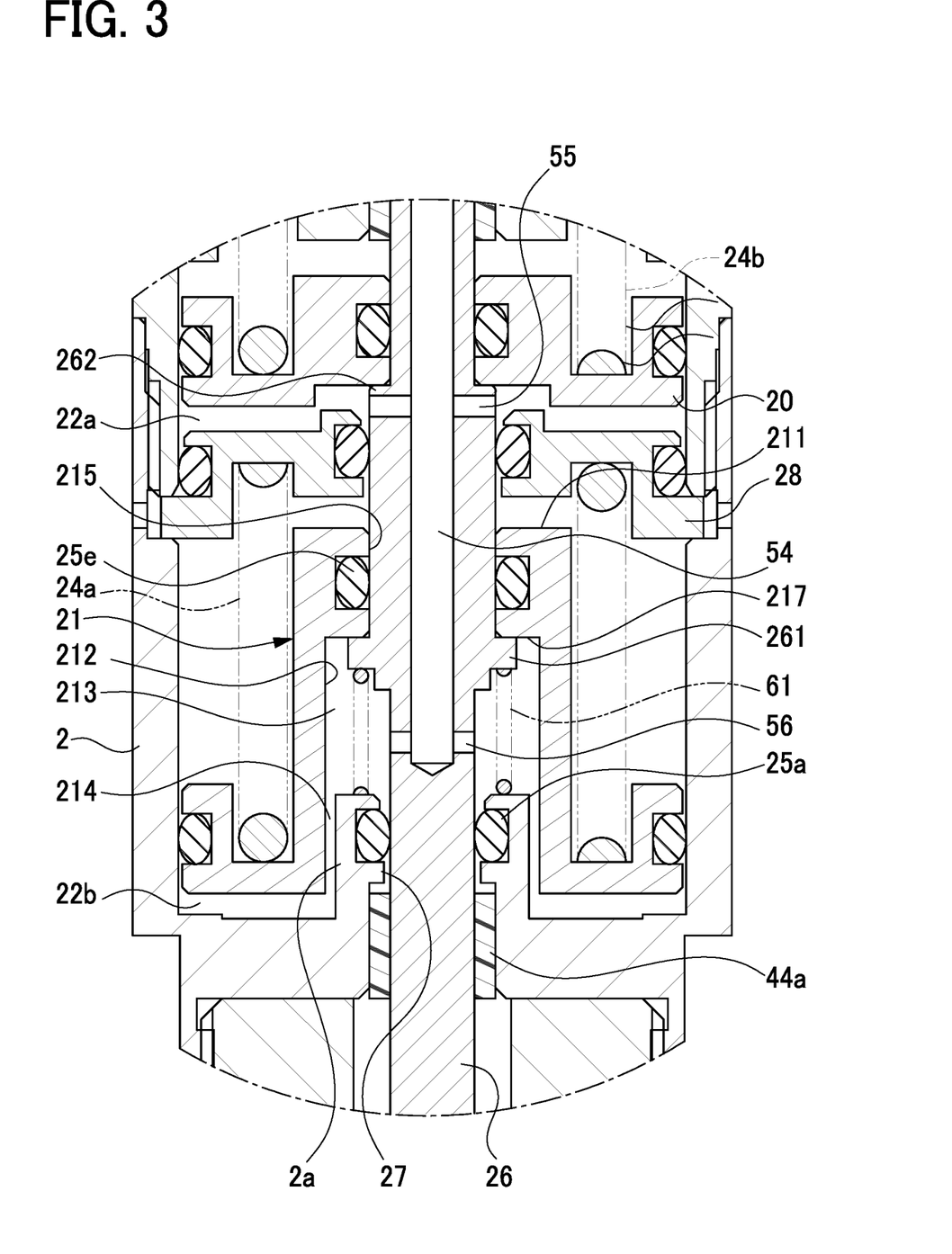
FIG. 3 is an enlarged view of an area A in FIG. 1.
Figure 4:
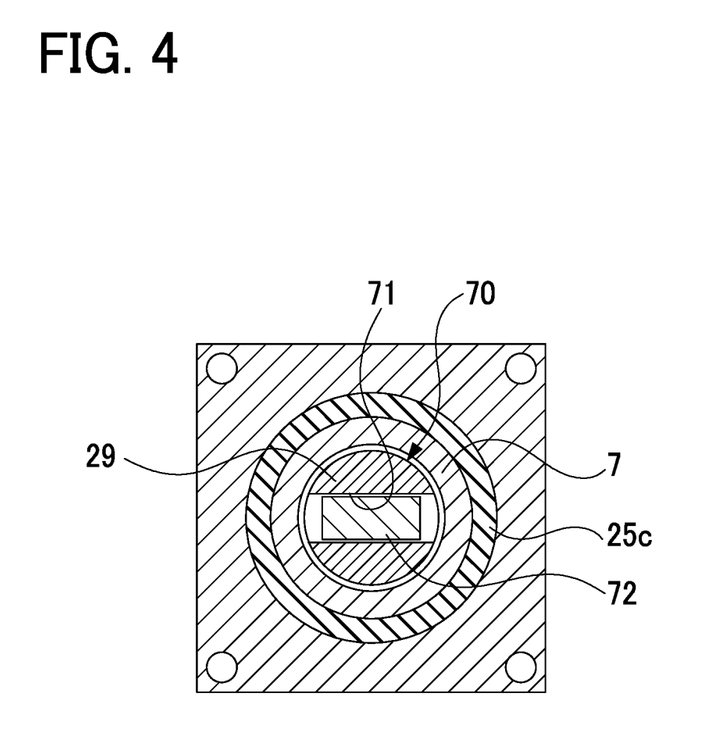
FIG. 4 is a cross-sectional view of the combination valve taken along a line B-B in FIG. 1.
Figure 5:
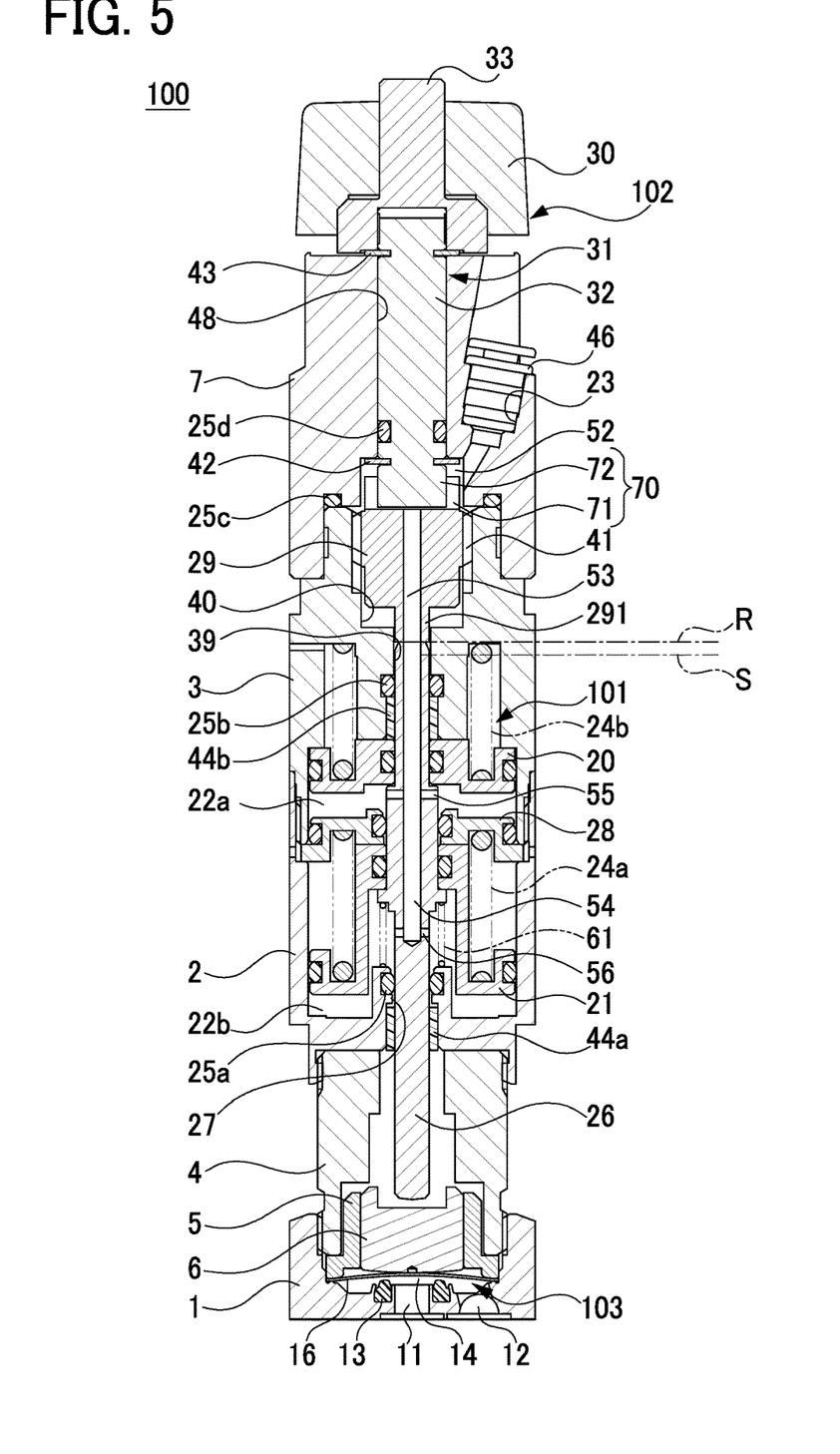
FIG. 5 is a vertical cross-sectional view of the combination valve, in which the manual system is in the safety-system releasing state, the pilot system is in an automatic opening state, and the valve system is in a valve open state.
Figure 6:
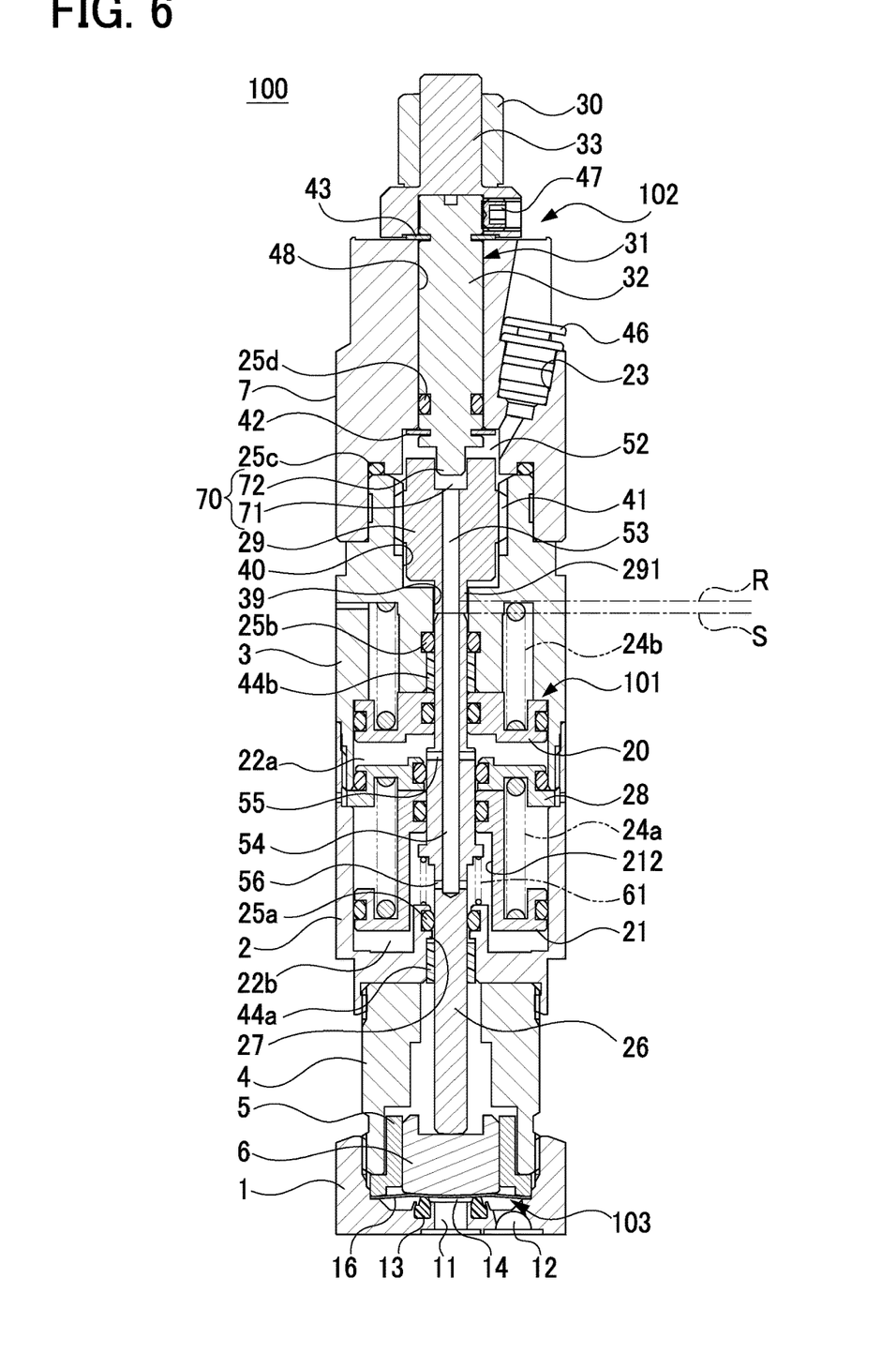
FIG. 6 is a vertical cross-sectional view of the combination valve, in which the manual system is in a safety-system setting state, the pilot system is in the automatic opening state, and the valve system is in the valve closed state.
Figure 7:
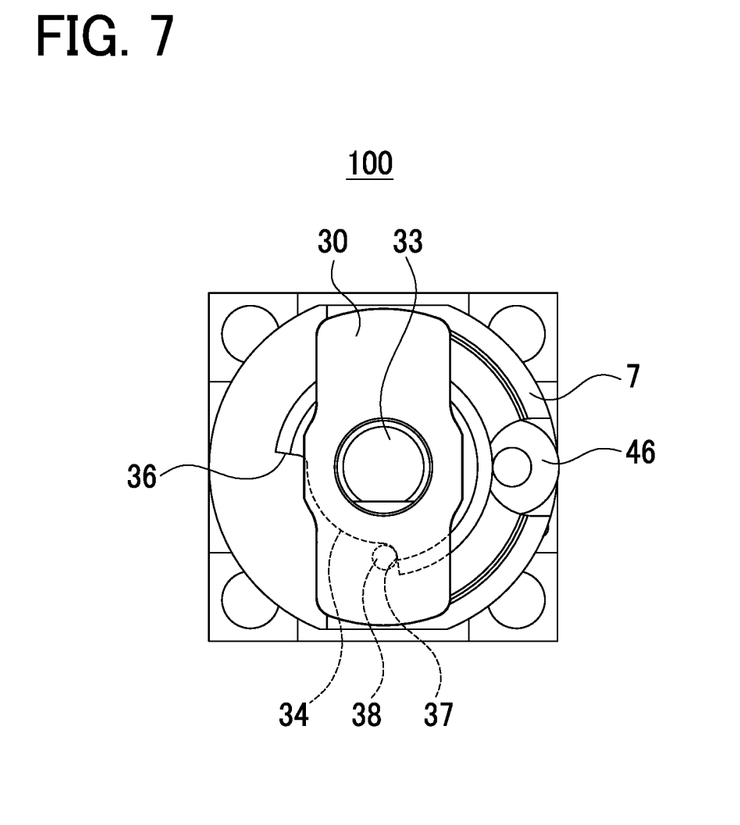
FIG. 7 is a plan view of the combination valve shown in FIG. 6.
Figure 8:
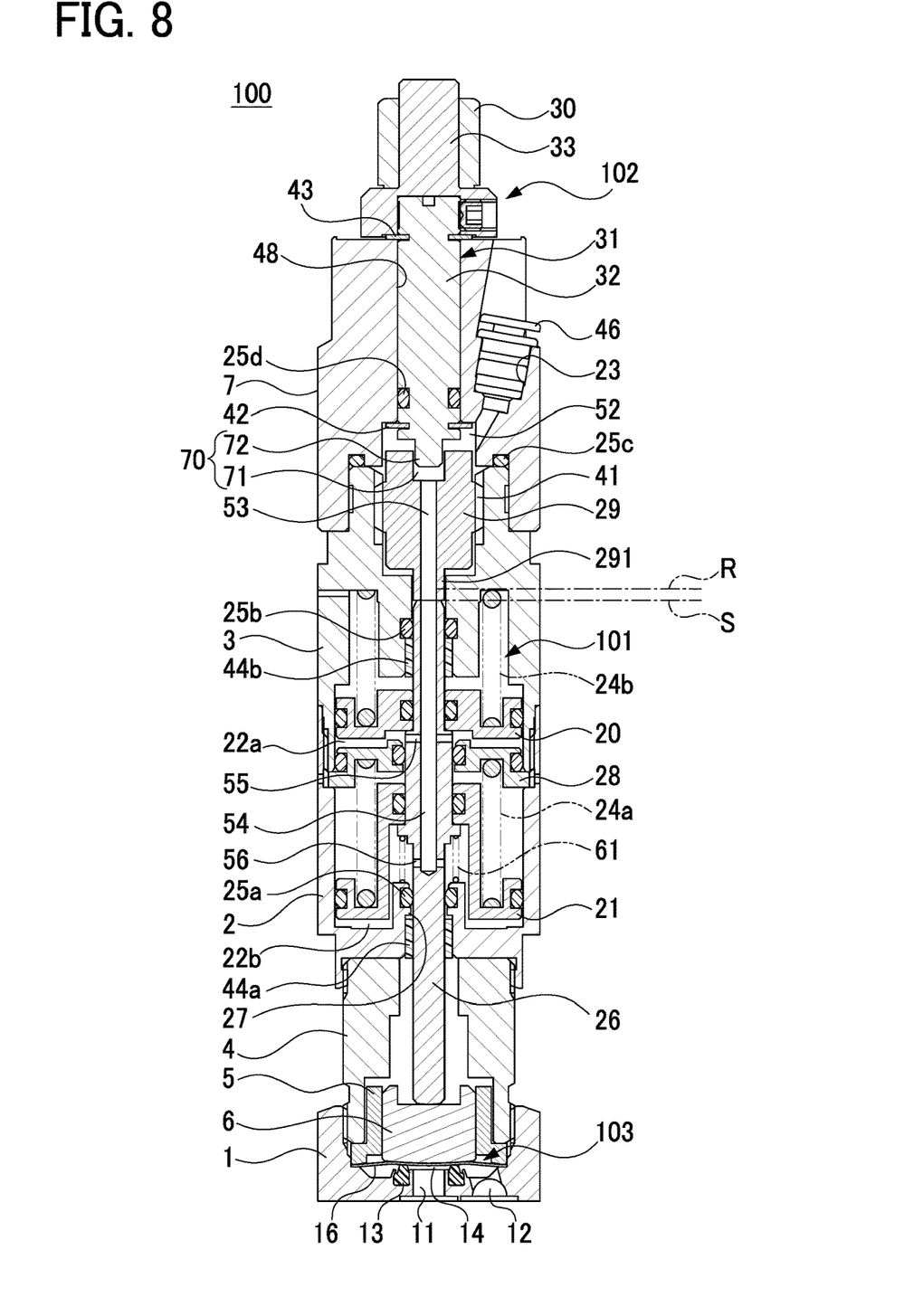
FIG. 8 is a vertical cross-sectional view of the combination valve, in which the manual system is in the safety-system setting state, the pilot system is in the automatic closing state, and the valve system is in the valve closed state.

A detailed description of an embodiment of a combination valve according to the present disclosure will now be given referring to the accompanying drawings. FIG. 1 is a vertical cross-sectional view of a combination valve 100 in the embodiment of this disclosure in which a manual system 102 is in a safety-system releasing state, a pilot system 101 is in an automatic closing state, and a valve system 103 is in a valve closed state. FIG. 2 is a plan view of the combination valve 100 shown in FIG. 1. FIG. 3 is an enlarged view of an area A encircled with a chain line in FIG. 1. FIG. 4 is a cross-sectional view of the combination valve 100 taken along a line B-B in FIG. 1. FIG. 5 is a vertical cross-sectional view of the 100 in which the manual system 102 is in the safety-system releasing state, the pilot system 101 is in an automatic opening state, and the valve system 103 is in a valve open state. FIG. 6 is a vertical cross-sectional view of the combination valve 100 in which the manual system 102 is in a safety-system setting state, the pilot system 101 is in the automatic opening state, and the valve system 103 is in the valve closed state. FIG. 7 is a plan view of the combination valve 100 shown in FIG. 6. FIG. 8 is a vertical cross-sectional view of the combination valve 100 in which the manual system 102 is the safety-system setting state, the pilot system 101 is in the automatic closing state, and the valve system 103 is in the valve closed state. In the present embodiment, the term "upper" indicates the side or position close to a handle 30 in the combination valve 100 and the term "lower" indicates the side or position close to a valve body 1 in the combination valve 100. The position, or orientation, of the handle 30 shown in FIG. 2 is assumed as an "automatic opening/closing enabling position" and the position, or orientation, shown in FIG. 7 is assumed as an "automatic opening/closing disabling position".

(Whole Configuration of the Combination Valve)

As shown in FIG. 1, the combination valve 100 integrally includes a valve body 1, a lower cover 4, a lower cylinder 2, an upper cylinder 3, and an upper cover 7. The combination valve 100 is provided with a valve system 103 configured to control a flow of fluid, a pilot system 101 configured to automatically open and close the valve system 103 with air pressure, and a manual system 102 configured to hold the valve system 103 in a valve closed state even while the air pressure is supplied to the combination valve 100 and serves as a safety device for preventing malfunction of the pilot system 101.

(Configuration of the Valve System)

The valve system 103 is provided with the valve body 1, a diaphragm valve element 16, a valve seat 13, an inlet port 11, and an outlet port 12. The valve body 1 is designed so that the inlet port 11 and the outlet port 12 communicate with each other through a communication part 14. The diaphragm valve element 16 is held, at its outer edge, between the valve body 1 and a cylindrical stem holder 5 and is deformable to contact with or separate from the valve seat 13. The valve body 1 and the lower cover 4 are hermetically divided by the diaphragm valve element 16 to prevent a fluid flowing through the communication part 14 from leaking into the lower cover 4.

The stem 6 is placed slidably in the stem holder 5. The lower surface of the stem 6 contacts with the diaphragm valve element 16. This diaphragm valve element 16 is arranged so as to separate from the valve seat 13 when the diaphragm valve element 16 is not urged downward (in a seating direction) by the stem 6 and to contact with the valve seat 13 when the diaphragm valve element 16 is urged downward by the stem 6.

(Configuration of the Pilot System)

The pilot system 101 is provided with the lower cylinder 2, the upper cylinder 3, the upper cover 7, a first piston 20, a second piston 21, a piston rod 26, a first spring 24b, and a second spring 24a. The first piston 20 and the second piston 21 are one example of a "piston". The first spring 24b and the second spring 24a are one example of a "first urging member". The pilot system 101 in the present embodiment includes two pistons, but may be provided with one pair of a piston and a spring or three or more pairs of pistons and springs.

The lower cylinder 2 and the upper cylinder 3 are hermetically separated by a partition part 28. The first piston 20 is mounted slidably in the upper cylinder 3. The internal space of the upper cylinder 3 is hermetically separated by the first piston 20 into upper and lower, two chambers. The lower chamber is a first pressure chamber 22a. The second piston 21 is mounted slidably in the lower cylinder 2. The internal space of the lower cylinder 2 is hermetically separated by the second piston 21 into upper and lower, two chambers. The lower chamber is a second pressure chamber 22b.

The upper cover 7 is provided with an operation port 23 that opens for supply and discharge of operation air. In the operation port 23, a joint 46 is attached. The operation port 23 communicates with the first pressure chamber 22a through a communication passage 53 formed in a lower stem 29, a central passage 54 and a first bypass passage 55 formed in the piston rod 26, and further communicates with the second pressure chamber 22b through a second bypass passage 56 formed in the piston rod 26.

The first spring 24b is placed in a compressed state on the first piston 20 to always urge the first piston 20 downward. The second spring 24a is placed in a compressed state on the second piston 21 to always urge the second piston 21 downward.

The piston rod 26 extends through the first piston 20 and the second piston 21 so that the piston rod 26 is slidable in a vertical direction. The piston rod 26 is held through a first bearing 44b to be vertically movable in an upper through hole 39 of the upper cylinder 3 and is held through a second bearing 44a to be vertically movable in a lower through hole 27 of the lower cylinder 2. Further, the piston rod 26 is inserted in the upper through hole 39 with an O-ring 25b and the lower through hole 27 with an O-ring 25a, so that the piston rod 26 hermetically slides inside the upper cylinder 3 and the lower cylinder 2. The piston rod 26 has a lower end portion extending toward the valve body 1 so that a lowermost end reaches to the stem 6.

The piston rod 26 is provided, as shown in FIG. 3, with a step portion 262 which is located under the first piston 20 (i.e., facing to the valve seat 13) and a contact portion 261 at a position under the second piston 21. The first piston 20 urged by the first spring 24b abuts against the step portion 262 of the piston rod 26 and the second piston 21 urged by the second spring 24a abuts against the contact portion 261 of the piston rod 26, so that the piston rod 26 is urged downward by the total force of the spring force of the first spring 24b and the spring force of the second spring 24a. The step portion 262 and the contact portion 261 are one example of a "contact portion".

A third spring 61 is placed in a compressed state between the contact portion 261 and the lower cylinder 2, thereby urging the piston rod 26 upward (i.e., in a separating direction away from the valve seat 13) by the spring force of the third spring 61. The spring force of the third spring 61 is smaller than the total force of the spring force of the first spring 24b and the spring force of the second spring 24a. The third spring 61 is one example of a "second urging member". Thus, when the first pressure chamber 22a and the second pressure chamber 22b are not pushed, the piston rod 26 is biased downward, making the diaphragm valve element 16 contact with the valve seat 13 through the stem 6.

The second piston 21 includes a central part 211 protruding upward, or in the separating direction, and having a recess portion 212, at the center of which is formed with a central through hole 215. The piston rod 26 is inserted through the central through hole 215 with an O-ring 25e to be hermetically slidable in the second piston 21, so that the contact portion 261 abuts on the inner wall of the central portion 211 formed with the recess portion 212. The recess portion 212 forms a cavity 213 in which the third spring 61 is accommodated.

The lower cylinder 2 is provided with a boss 2a protruding upward into the recess portion 212, i.e., the central part 211. The outer diameter of the boss 2a is set to be smaller than the inner diameter of the recess portion 212 so that a gap 214 is annually provided between the inner surface of the recess portion 212 and the outer peripheral surface of the boss 2a. The piston rod 26 is formed with the second bypass passage 56 below the contact portion 261. Accordingly, the operation air is supplied through the second bypass passage 56 to the cavity 213, the gap 214, and the second pressure chamber 22b without leaking above the second piston 21. This operation air thus pressurizes the second piston 21 upward.

(Configuration of the Manual System)

The manual system 102 is provided with a manual stem 31, a handle 30, and a screw part 41 as shown in FIG. 1. The manual stem 31 includes a cam member 33, an upper stem 32, and a lower stem 29. The upper stem 32 is one example of a "first stem" and the lower stem 29 is one example of a "second stem".

The upper stem 32 is inserted through an insertion hole 48 of the upper cover 7 and is placed above the lower stem 29. The upper stem 32 is attached to the upper cover 7 with C-rings 43 and 42 and placed in the insertion hole 48 so as to be only rotatable.

As shown in FIG. 6, the cam member 33 is fixed to a top end of the upper stem 32 protruding out of the upper cover 7 by use of a stopper screw 47. As shown in FIG. 7, the handle 30 is coupled to the cam member 33 so that the handle 30 is inhibited from rotating with respect to the cam member 33. Thus, the upper stem 32, the cam member 33, and the handle 30 are rotatable together. As shown in FIGS. 1 and 6, the upper stem 32 engages with the lower stem 29 through an engagement part 70 to rotate the lower stem 29 according to turning of the handle 30.

The upper stem 32 includes a lower end portion protruding into a bottom-closed hole 52 formed in the upper cover 7 and further includes an engagement element 72 protruding downward from the lower end portion. The lower stem 29 is formed, in its upper surface located opposite the valve seat 13, with an engagement groove 71 in which the engagement element 72 is loosely fit in the engagement groove 71. These engagement element 72 and engagement groove 71 constitute the engagement part 70.

For instance, as shown in FIG. 4, the engagement element 72 and the engagement groove 71 are each designed in a linear shape and engaged with each other to enable the upper stem 32 and the lower stem 29 to be integrally rotated. The engagement part 70 is configured to have a clearance between the inner wall of the engagement groove 71 and the engagement element 72 to provide an allowance or play region in which the rotation of the upper stem 32 is not transmitted to the lower stem 29.

As shown in FIG. 1, the upper surface of the upper cylinder 3 is formed with an opening 40 coaxial with the upper through hole 39. The lower stem 29 is placed in the opening 40 and attached to the upper cylinder 3 with a screw part 41 so that the lower stem 29 is movable in the vertical direction. The lower stem 29 is provided with a stopper part 291 protruding from the center of the lower surface of the lower stem 29, the lower surface being located facing to the valve seat 13. The stopper part 291 is located to be slidably set in the upper through hole 39 and abuttable on the top end of the piston rod 26 within the upper through hole 39.

The lower stem 29 includes a communication passage 53 formed extending therethrough in an axial direction. The communication passage 53 communicates, through the upper through hole 39, with the central passage 54 which opens in the top end of the piston rod 26. As described above, the clearance is provided between the inner wall of the engagement groove 71 and the engagement element 72. By utilizing this clearance, the communication passage 53 communicates with the bottom-closed hole 52. To prevent the operation air supplied to the bottom-closed hole 52 through the operation port 23 from leaking outside, an O-ring 25c is placed between the upper cover 7 and the upper cylinder 3 and an O-ring 25d is placed between the upper cover 7 and the upper stem 32.

As shown in FIGS. 2 and 7, the cam member 33 is provided with a cam face 34 configured to restrict rotation of the manual system 102 when the cam surface 34 is engaged with a pin 38 protruding from the upper surface of the upper cover 7. The cam face 34 includes a first stopper part 36 and a second stopper part 37 each of which is engageable with the pin 38. As shown in FIGS. 1 and 2, the first stopper part 36 is provided in a position to restrict turning of the handle 30 when the lower stem 29 is disposed at a safety-system releasing position R where the lower surface of the stopper part 291 of the lower stem 29 is separated from the top end of the piston rod 26 while the valve system 103 is in a valve closed state. As shown in FIGS. 6 and 7, the second stopper part 37 is provided in a position to restrict turning of the handle 30 when the lower stem 29 is disposed at a safety-system setting position S where the lower surface of the stopper part 291 of the lower stem 29 is in contact with the top end of the piston rod 26.

(Operations: Normal Operation)

In FIG. 1, the handle 30 is disposed in the automatic opening/closing enabling position and the lower stem 29 is separated from the piston rod 26 by a predetermined distance. This state of the manual system 102 in which the lower stem 29 and the piston rod 26 are separated and the stopper part 291 is placed in the safety-system releasing position R while the valve system 103 is in a valve closed state as above is defined as a "safety-system releasing state".

In FIG. 1, the first piston 20 and the second piston 21 are urged downward by the first spring 24b and the second spring 24a respectively. The piston rod 26 is in contact with the stem 6 while the step portion 262 and the contact portion 261 are pressed downward by the first piston 20 and the second piston 21 respectively, and the third spring 61 is in a compressed state. The diaphragm valve element 16 is brought into contact with the valve seat 13 by the stem 6. Thus, the communication part 14 is shut off by the diaphragm valve element 16, so that a fluid flowing in the inlet port 11 is blocked from flowing to the outlet port 12.

This state of the pilot system 101 in which the first piston 20 and the second piston 21 are respectively urged to stay down by the first spring 24b and the second spring 24a is defined as an "automatic closing state". The state of the valve system 103 in which the diaphragm valve element 16 is in contact with the valve seat 13 is defined as a "valve closed state".

When the manual system 102 is placed in the safety-system releasing state to separate the diaphragm valve element 16 from the valve seat 13 as shown in FIG. 5, operation air is supplied to the operation port 23. This operation air flows from the operation port 23 to the bottom-closed hole 52, the communication passage 53, and the central passage 54. The operation air then flows from the central passage 54 into the first pressure chamber 22a through the first bypass passage 55, thereby increasing the internal pressure of the first pressure chamber 22a. The operation air also flows from the central passage 54 into the second pressure chamber 22b through the second bypass passage 56, thereby increasing the internal pressure of the second pressure chamber 22b.

As the internal pressure of the first pressure chamber 22a and the internal pressure of the second pressure chamber 22b rise, the first piston 20 and the second piston 21 are caused to slide in the upper cylinder 3 and the lower cylinder 2 respectively and move upward against the urging forces of the first spring 24b and the second spring 24a.

In association with upward motion of the the first piston 20 and the second piston 21, the downward urging force acting on the piston rod is reduced. This allows the third spring 61 to stretch out. Accordingly, the piston rod 26 moves upward following the first piston 20 and the second piston 21 while keeping the step portion 262 in contact with the first piston 20 and the contact portion 261 in contact with the second piston 21. When the piston rod 26 moves upward until its top end comes into contact with the lower surface of the stopper part 291 of the lower stem 29, the first piston 20 and the second piston 21 respectively contact with the upper cylinder 3 and the partition part 28, so that the pistons 20 and 21 are not allowed to further move upward.

When the piston rod 26 moves upward, separating from the stem 6, the diaphragm valve element 16 is not urged downward and thus separates from the valve seat 13. This provides communication between the inlet port 11 and the outlet port 12 through the communication part 14, allowing the fluid flowing in the inlet port 11 to flow to the outlet port 12.

The above state of the pilot system 101 in which the first piston 20 and the second piston 21 are moved in the separating direction by the air pressure against the first spring 24b and the second spring 24a is defined as an "automatic opening state". The state of the valve system 103 in which the diaphragm valve element 16 is separated from the valve seat 13 is defined as a "valve open state".

When the operation air is discharged out from the first pressure chamber 22a and the second pressure chamber 22b through the first bypass passage 55, the second bypass passage 56, the central passage 54, the communication passage 53, the bottom-closed hole 52, and the operation port 23, the internal pressure of the first pressure chamber 22a and the internal pressure of the second pressure chamber 22b decrease. Accordingly, the first piston 20 and the second piston 21 are slid respectively inside the upper cylinder 3 and the lower cylinder 2 by the urging forces of the first spring 24b and the second spring 24a. At that time, the step portion 262 and the contact portion 261 of the piston rod 26 are respectively urged to contact with the lower surface of the first piston 20 and the lower surface of the second piston 21, each lower surface being located facing to the valve seat 13, by the spring force of the third spring 61. The piston rod 26 is moved in the seating direction by the first piston 20 and the second piston 21, thereby urging the stem 6 downward to bring the diaphragm valve element 16 into contact with the valve seat 13.

When the manual system 102 is in the safety-system releasing state, therefore, the pilot system 101 can operate the valve system 103 by air pressure with high responsibility.

The following description is given to the case that the valve system 103 in the valve open state as shown in FIG. 5 is brought into into the valve closed state as shown in FIG. 6 by the manual system 102.

The handle 30 is first turned clockwise, seen from above, from the automatic opening/closing enabling position shown in FIG. 2 to the automatic opening/closing disabling position shown in FIG. 7. Accordingly, the upper stem 32 rotates integral with the handle 30 through the cam member 33. When the lower stem 29 receives the torque from the upper stem 32 through the engagement part 70, the lower stem 29 moves downward by screw feeding of the screw part 41, the lower surface of the stopper part 291 is moved from the safety-system releasing position R to the safety-system setting position S to press the piston rod 26 downward.

As shown in FIG. 6, the piston rod 26 is pressed downward by a downward force applied from the lower stem 29 without changing the positions of the first piston 20 and the second piston 21 applied with pressure of the operation air, thereby compressing the third spring 61, and urging the stem 6 downward. Thus, the diaphragm valve element 16 is brought into contact with the valve seat 13 by the force applied from the piston rod 26. This diaphragm valve element 16 shuts off the communication part 14, so that no fluid flows from the inlet port 11 to the outlet port 12.

When the second stopper part 37 contacts with the pin 38 as shown in FIG. 7, the handle 30 is not allowed to further turn clockwise. Thus, the lower stem 29 no longer moves beyond the safety-system setting position S and hence does not excessively press the diaphragm valve element 16 against the valve seat 13 through the piston rod 26 and the stem 6. This prevents breakage of the valve system 103 or wear-out of the valve seat 13 and thus enhances the durability of the combination valve 100. This state of the manual system 102 in which the stopper part 291 of the lower stem 29 is moved to the safety-system setting position S and contacts with the piston rod 26 while the diaphragm valve element 16 is in contact with the valve seat 13 is defined as a "safety-system setting state".

When the pilot system 101 is in the automatic opening state as shown in FIGS. 5 and 6, if the manual system 102 is operated to move the lower stem 29 downward from the safety-system releasing position R to the safety-system setting position S to forcibly bring the valve system 103 from the valve open state to the valve closed state, the piston rod 26 is moved downward by separating the step portion 262 and the contact portion 261 respectively from the first piston 20 and the second piston 21, i.e., the piston rod 26 is moved separately from the first piston 20 and the second piston 21. Thus, only the spring force of the third spring 61 acts on the piston rod 26 to move upward. This spring force of the third spring 61 is smaller than the total force of the spring force of the first spring 24b and the spring force of the second spring 24a. Accordingly, the combination valve 100 is smaller in frictional resistance generated in the screw part 41 than the conventional combination valve in which the air pressure pressurizing the piston in the separating direction acts on the screw part as described in for example Japanese Patent No. 4261282. Thus, the handle 30 of the combination valve 100 needs only a smaller force to turn clockwise than the handle of the conventional combination valve.

In the combination valve 100 in the state shown in FIG. 6, when the operation air is discharged from the first pressure chamber 22a and the second pressure chamber 22b and thus the internal pressure of the first pressure chamber 22a and the second pressure chamber 22b decrease, the first piston 20 and the second piston 21 are urged downward respectively by the first spring 24b and the second spring 24a. At that time, the piston rod 26 is placed with the step portion 262 and the contact portion 261 being separated respectively from the first piston 20 and the second piston 21. Thus, the first piston 20 and the second piston 21 are moved downward as shown in FIG. 8 without changing the position of the piston rod 26, and hence the pilot system 101 enters the automatic closing state. The combination valve 100 can therefore change from the automatic opening state to the automatic closing state without changing the sealing strength that presses the diaphragm valve element 16 against the valve seat 13.

In the combination valve 100 in such a state as shown in FIG. 8, even when the operation air is supplied to the first pressure chamber 22a and the second pressure chamber 22b, pushing the first piston 20 and the second piston 21 upward, the piston rod 26 is held in contact with the stopper part 291 of the lower stem 29 and restricted from upward movement. Accordingly, the first piston 20 and the second piston 21 are moved upward without changing the position of the piston rod 26 as shown in FIG. 6. This combination valve 100 can hold the valve system 103 in the valve closed state without applying a load on the screw part 41 even when the air pressure is supplied to the combination valve 100.

While the manual system 102 is in the safety-system setting state, the combination valve 100 configured as above can stably maintain the valve closed state of the valve system 103 even if the operation air is supplied to the combination valve 100. Moreover, when the manual system 102 of the combination valve 100 is in the safety-system setting state, only the spring force of the third spring 61 acts on the screw part 41. This screw part 41 can be designed small in size, resulting in a reduced valve size of the combination valve 100.

Meanwhile, the engagement part 70 includes an allowance or play for loose fit between the engagement groove 71 and the engagement element 72. Accordingly, while the handle 30 is disposed in the automatic opening/closing disabling position shown in FIG. 7, even if for example an operator erroneously touches or hits the handle 30, thereby causing turning of the handle 30, the lower stem 29 is not immediately rotated owing to the allowance in the engagement part 70 and thus the valve system 103 is not changed from the valve closed state to the valve open state.

In the combination valve 100 in the state shown in FIG. 1, when the handle 30 is turned clockwise seen from above, the manual system 102 can be changed from the safety-system releasing state to the safety-system setting state as shown in FIG. 8. In this case, of course, the combination valve 100 can also hold the valve system 103 in the valve closed state even while air pressure is being supplied to the combination valve 100.

The combination valve 100 in the present embodiment, as described above, includes the valve seat 13, the diaphragm valve element 16, the pilot system 101 configured to automatically bring the diaphragm valve element 16 into or out of contact with the valve seat 13 by use of air pressure, and the manual system 102 configured to hold the diaphragm valve element 16 in contact with the valve seat 13 even while the air pressure is supplied to the pilot system 101. In this combination valve 100, the pilot system 101 includes the first piston 20, the second piston 21, the first spring 24b and the second spring 24a that respectively urge the first piston 20 and the second piston 21, and the piston rod 26 slidably extending through the first piston 20 and the second piston 21. The piston rod 26 is configured to bring the diaphragm valve element 16 into contact with the valve seat 13 when the piston rod 26 receives the urging forces of the first spring 24b and the second spring 24a through the second piston 21. The manual system 102 includes the manual stem 31 placed coaxially with the piston rod 26, the handle 30 coupled to the manual stem 31, and the screw part 41 configured to move the manual stem 31 in the axial direction according to turning of the handle 30. The piston rod 26 is arranged such that, in the case where the diaphragm valve element 16 is out of contact with the valve seat 13, when the handle 30 is turned to move the manual stem 31, the piston rod 26 is moved in the seating direction relative to, i.e., separately from, the first piston 20 and the second piston 21.

In the combination valve 100 configured as above, in the case where the diaphragm valve element 16 is out of contact with the valve seat 13, when the handle 30 is turned to move the piston rod 26 in the seating direction, the piston rod 26 is separated from the first piston 20 and the second piston 21 that receive the air pressure acting in the separating direction. Thus, the air pressure acting on the first piston 20 and the second piston 21 do not act on the screw part 41 through the piston rod 26. The combination valve 100 therefore needs only a smaller force to turn the handle 30 than the conventional combination valve in which the piston rod is integrally provided to the piston and air pressure acting on the piston acts on the screw part through the piston rod (e.g., Japanese Patent No. 4261282). Furthermore, the combination valve 100 needs no additional flow passage or component used to reduce the air pressure that acts on the first piston 20 and the second piston 21. This combination valve 100 is thus simple in structure. The combination valve 100 in the present embodiment enables the handle 30 to be turned with a small force through a simple structure when the diaphragm valve element 16 and the valve seat 13 are out of contact.

In the combination valve 100 in the present embodiment, the piston rod 26 includes the contact portion 261 configured to contact with or separate from the face 217 of the second piston 21, the face 217 being located facing to the valve seat 13. The third spring 61 has an urging force smaller than the total force of the spring force of the first spring 24b and the spring force of the second spring 24a and urges the piston rod 26 in the separating direction.

According to the combination valve 100 configured as above, when the pilot system 101 is operated to bring the diaphragm valve element 161 into or out of contact with the valve seat 13, the piston rod 26 moves following the first piston 20 and the second piston 21. This can control a fluid flow with high responsibility. According to the combination valve 100 in the present embodiment, the urging force of the third spring 61 is smaller than the total force of the urging force of the first spring 24b and the urging force of the second spring 24a, so that the force to turn the handle 30 when the diaphragm valve element 16 is out of contact with the valve seat 13 can be made smaller than in the conventional valve.

In the combination valve 100 configured as above, the manual stem 31 includes the upper stem 32 placed to be only rotatable together with the handle 30, the lower stem 29 placed to be movable in the axis direction by screw feeding of the screw part 41, and the engagement part 70 configured to engage the upper stem 32 with the lower stem 29. The engagement part 70 includes an allowance or play. The combination valve 100 in the present embodiment can therefore provide an allowance for operation of the handle 30 to prevent malfunction.

The foregoing embodiments are mere examples and give no limitation to the present invention disclosure. The present invention disclosure may be embodied in other specific forms without departing from the essential characteristics thereof.

For instance, the upper stem 32 and the lower stem 29 may be made in one piece and the upper stem 32 may be placed rotatably and movably in the vertical direction. However, the above embodiment that the upper stem 32 and the lower stem 29 are separately provided and the engagement element 72 and the engagement groove 71 constitute the engagement part 70 having an allowance for loose fit can enhance the operational ability of the manual system 102 with a simple structure.

For example, the engagement piece 72 and the engagement groove 71 are not limited to the foregoing linear shape and may have any shape, such as a cross shape and a polygonal shape as long as they can transmit the torque from the upper stem 32 to the lower stem 29.

For instance, the operation port 23 may be provided in the upper cylinder 3 instead of the upper cover 7. In the foregoing embodiment, however, a pipe can be connected to the operation port 23 from above the top surface of the upper cover 7, so that the pipe space for the combination valve 100 can be reduced. As an alternative, the operation port 23 may be provided in the upper surface of the manual stem 31 and the manual stem may be provided with a communication passage that allows communication between the operation port and the central passage 54 of the piston rod 26.

For instance, the upper stem 32 and the handle 30 may be directly connected to each other and the cam member 33 is dispensed. However, the foregoing embodiment including the cam member 33 to restrict the turning of the handle 30 can prevent the diaphragm valve element 16 from being excessively pressed against the valve seat 13 when the manual system 102 is placed in the safety-system setting state. This can enhance the durability of the combination valve 100.

For example, the combination valve 100 may be a poppet valve.

For example, the lower cylinder 2 may not be provided with the boss 2a. However, the lower cylinder 2 provided with the boss 2a as in the embodiment enables the second bearing 44a and the O-ring 25a to be arranged in vertical alignment without changing the length of the lower cylinder 2 in the vertical direction. This can reduce the valve size of the combination valve 100.

REFERENCE SIGNS LIST

13 Valve seat
16 Diaphragm valve element
20 First piston
21 Second piston
24b First spring
24a Second spring
26 Piston rod
29 Lower stem
30 Handle
31 Manual stem
32 Upper stem
61 Third spring
70 Engagement part
100 Combination valve
101 Pilot system
102 Manual system
103 Valve system
212 Recess
217 Face
261 Contact portion

What is claimed is:

1. A combination valve comprising:
a valve seat;
a valve element;
a pilot system configured to automatically bring the valve element into or out of contact with the valve seat by use of air pressure, the pilot system including:
a piston;
a first urging member configured to urge the piston in a seating direction; and
a piston rod slidably extending through the piston, the piston rod being configured to bring the valve element into contact with the valve seat when the piston rod receives an urging force of the first urging member through the piston; and a manual system configured to hold the valve element in contact with the valve seat even while the air pressure is supplied to the pilot system, the manual system including:

a manual stem placed coaxially with the piston rod;

a handle coupled to the manual stem, the piston rod being movable in the seating direction relative to the piston when the handle is turned to move the manual stem in the seating direction while the valve element is separated from the valve seat when the air pressure supplied to the pilot system acts on the piston in a separating direction opposite to the seating direction; and a screw part configured to move the manual stem in an axial direction according to turning of the handle.

2. The combination valve according to claim 1, wherein the manual stem includes:

a first stem that is only rotatable integrally with the handle;

a second stem that is movable in the axial direction by screw feeding of the screw part; and an engagement part configured to engage the first stem with the second stem.

3. A combination valve comprising:

a valve seat;

a valve element;

a pilot system configured to automatically bring the valve element into or out of contact with the valve seat by use of air pressure, the pilot system including:

a piston;

a first urging member configured to urge the piston in a seating direction; and a piston rod slidably extending through the piston, the piston rod being configured to bring the valve element into contact with the valve seat when the piston rod receives an urging force of the first urging member through the piston, the piston rod including a contact portion configured to contact with or separate from a face of the piston, the face of the piston being located facing toward the valve seat;

a manual system configured to hold the valve element in contact with the valve seat even while the air pressure is supplied to the pilot system, the manual system including:

a manual stem placed coaxially with the piston rod;

a handle coupled to the manual stem, the piston rod being movable in the seating direction relative to the piston when the handle is turned to move the manual stem in the seating direction while the valve element is separated from the valve seat; and a screw part configured to move the manual stem in an axial direction according to turning of the handle; and a second urging member having a smaller urging force than the first urging member and urging the piston rod in a separating direction opposite to the seating direction.

4. The combination valve according to claim 3, wherein:

the piston includes a recess part protruding in the separating direction, and the second urging member is placed inside the recess part.

5. The combination valve according to claim 4, wherein the manual stem includes:

a first stem that is only rotatable integrally with the handle;

a second stem that is movable in the axial direction by screw feeding of the screw part; and an engagement part configured to engage the first stem with the second stem.

6. The combination valve according to claim 3, wherein the manual stem includes:

a first stem that is only rotatable integrally with the handle;

a second stem that is movable in the axial direction by screw feeding of the screw part; and an engagement part configured to engage the first stem with the second stem.

\* \* \* \* \*